United States Patent [19]

Dotson, Jr. et al.

[11] 3,903,109

[45] Sept. 2, 1975

[54] HALO IMIDE FIRE RETARDANT COMPOSITIONS

[75] Inventors: Anderson O. Dotson, Jr., New Brunswick; Jack Newcombe; Lionel T. Wolford, both of Freehold, all of N.J.

[73] Assignee: Cities Service Oil Company, Tulsa, Okla.

[22] Filed: Sept. 5, 1973

[21] Appl. No.: 394,960

Related U.S. Application Data

[62] Division of Ser. No. 183,696, Sept. 24, 1971, Pat. No. 3,784,509.

[52] U.S. Cl. .......................... 260/326 C; 260/326 H
[51] Int. Cl.² ............... C07D 209/34; C07D 405/02
[58] Field of Search .................. 260/326 C, 326 HL

[56] References Cited
UNITED STATES PATENTS

| | | | |
|---|---|---|---|
| 2,795,589 | 6/1957 | Bluestone | 260/326 C |
| 3,574,230 | 4/1971 | Cyba | 260/326 C |
| 3,730,942 | 5/1973 | Green | 260/326 C |
| 3,784,509 | 1/1974 | Dotson, Jr. | 260/45.75 B |

OTHER PUBLICATIONS

Vereschagin, A. N. et al., Chem. Abs. 79, 104632e, (1973) QD1A6.

*Primary Examiner*—Donald G. Daus
*Assistant Examiner*—Mark L. Berch
*Attorney, Agent, or Firm*—Patricia J. Hogan

[57] ABSTRACT

Fire retarding agents having the structure of substituted imides, with the imide portion derived from a halogenated Diels-Alder adduct of an unsaturated carboxylic compound such as maleic anhydride and a diene such as cyclopentadiene and the substituent group on the nitrogen being alkyl or aromatic, are useful in flame retardant plastic compositions.

10 Claims, No Drawings

HALO IMIDE FIRE RETARDANT COMPOSITIONS

This is a division of application Ser. No. 183,696, filed Sept. 24, 1971, now U.S. Pat. No. 3,784,509.

BACKGROUND OF THE INVENTION

1. Field of the Invention

This invention relates to compositions of normally flammable organic materials and fire retarding agents. More specifically, it relates to flame retardant compositions of an organic material, such as a solid synthetic polymer, and a fire retarding agent having the structure of a substituted imide, wherein the imide is derived from the Diels-Alder adduct of an unsaturated dicarboxylic acid or anhydride, such as maleic anhydride, and a diene, such as cyclopentadiene, and wherein the substituent group on the nitrogen is hydrogen, hydrocarbyl or substituted hydrocarbyl group such as alkyl, alkenyl, aryl, alkaryl, aralkyl or cycloaliphatic, and halogenated substituents thereof. The term "halogen", as used herein, means bromine or chlorine.

2. Description of the Prior Art

There is a growing awareness of the need to render normally flammable organic materials less combustible. A particularly acute need has been recognized for means of preparing solid synthetic polymers which are fire retardant or flame resistant, particularly when such polymers are to be employed in building construction or furnishing or in wearing apparel. The prior art attempts to reduce combustibility of such compositions by the incorporation of additives have succeeded in varying degrees in achieving acceptable levels of flame resistance; however, this has invariably been accompanied by degradation of one or more of the desirable properties of the polymer. This is usually due to the loading of additives that is required to achieve adequate level of fire retardancy, but is often the result of such factors as the migratory properties or high volatility of the additive or the instability of the additive at conventional plastic molding temperatures. Typical prior art additives are described in U.S. Pat. Nos. 3,093,599, 3,385,819 and 3,456,022.

SUMMARY

It has now been discovered that compounds having the structure of a substituted imide, wherein the imide portion is derived from a halogenated Diels-Alder adduct of an unsaturated dicarboxylic acid or anhydride and a diene and wherein any substituent group on the nitrogen is alkyl, alkenyl, aryl, alkaryl, aralkyl, aralkenyl or cycloaliphatic and halogenated substituents thereof, are effective fire retarding agents for normally flammable organic materials. The structure of the imide is

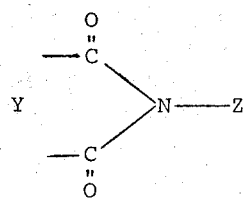

wherein Y has one of the structures

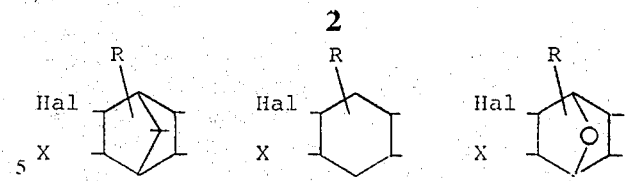

where R = —H or —$CH_3$ and X = —H or Hal and wherein Z is hydrogen, alkyl, alkenyl, aryl, alkaryl, aralkyl or cycloaliphatic and halogenated derivatives thereof. Hal = halogen. These fire retarding agents are effective in surprisingly low concentrations in organic compositions and are relatively insensitive to environmental conditions to which such compositions would ordinarily be exposed. Broadly, this invention is a fire retardant composition comprising a normally flammable organic material and an effective amount of a fire retarding agent having the structure of a substituted imide, wherein the imide is derived from a halogenated Diels-Alder adduct of an unsaturated dicarboxylic acid or anhydride and a diene, and wherein the substituent group on the nitrogen is hydrogen, alkyl, alkenyl, aryl, alkaryl, aralkyl, or cycloaliphatic group and halogenated substituents thereof. Another portion of the invention is the novel imide itself, as above defined.

DESCRIPTION OF THE INVENTION

The aforementioned fire retarding agents, which are suitable for incorporation in compositions of this invention, can be prepared by a variety of procedures. Broadly, the substituted imide is composed of two parts, a Diels-Alder portion and an amine portion. The halogenated Diels-Alder portion can be prepared by reacting an unsaturated dicarboxylic anhydride such as maleic anhydride with a diene such as cyclopentadiene, followed by halogenation of the unsaturation bond. Or, the Diels-Alder adduct may be formed by reacting a diene, such as a polyhalocyclopentadiene, with an unsaturated dicarboxylic anhydride, such as maleic anhydride. The anhydride portion of the adduct can be transformed to an imide group. This imide can be reacted, as a variation of the Gabriel synthesis, to give a hydrocarbyl group attached to the nitrogen. Or, ammonia or a primary amine, such as $RNH_2$, can be reacted directly with the anhydride portion of the adduct to give an imide or an N-substituted imide. Imides can be prepared by a variety of methods. One general method is to react a dicarboxylic acid, such as succinic acid, with ammonia. The resultant intermediate, ammonium succinate, decomposes during distillation to give succinimide. Another preparation is to heat phthalic anhydride with ammonium hydroxide until a homogeneous melt of phthalimide is obtained. Nitrogen-substituted imides can be formed by substituting a suitable group for the imide hydrogen. One method is to dissolve the imide, such as phthalimide, in a suitable solvent, such as ethanol, and to add KOH, forming the potassium imide. Then, a halogen-containing compound, such as ethylene dibromide, is added and heated, forming a substituted imide, such as crude β-Bromoethylphthalimide, which is then purified. Another method is to react an amino-containing compound, such as aniline, with an acid anhydride, such as citraconic anhydride. If the hydrocarbyl group attached to the nitrogen contains unsaturation, halogen can be added to this unsaturation, resulting in a compound containing halogen in the adduct portion and in the nitrogen substituent portion. The halogens in these separate portions can be the same halogen or mixed halogens, such as chlorine in one portion and bromine in the other portion.

The substituted imide can be formed from a reaction involving a dibasic acid or an acid anhydride. Maleic anhydride is the preferred dienophile used in preparing the Diels-Alder precursor compound, but an alkyl-substituted maleic anhydride, such as citraconic anhydride, can also be used. In similar fashion, maleic acid can be used to form the adduct, since the transformation from the acid to the anhydride is relatively easy. Similarly, citraconic acid can be used.

A wide variety of dienes having conjugated unsaturation is applicable to the Diels-Alder reaction. Exemplary are 1,3-butadiene, isoprene, chloroprene, piperylene, 2,4-hexadiene, and cyclopentadiene. Cyclopentadiene is the preferred diene in the reaction to form the Diels-Alder adduct. Alkyl cyclopentadienes, such as methyl cyclopentadiene, are also commercially available, and can be used. As previously mentioned, the halogen in the adduct portion of this compound can be added after the Diels-Alder adduct is formed, or the halogen can be a part of the substituted diene before the adduct is formed. Although cyclopentadiene is representative of the preferred type of dienes used in the preparation of the various fire retarding agent, substituted dienes, such as furan, in which oxygen is substituted for a —CH$_2$ group in cyclopentadiene, can also be used.

The substituent group on the imide nitrogen is, broadly, a hydrocarbyl or substituted hydrocarbyl group. Examples of these groupings, with specific compounds, are:

| | | |
|---|---|---|
| alkyl | - | ethyl or hexyl |
| alkenyl | - | allyl |
| aryl | - | phenyl |
| alkaryl | - | benzyl |
| aralkyl | - | tolyl or xylyl |
| aralkenyl | - | styryl |
| cycloalkyl | - | cyclooctyl |
| cycloalkenyl | - | cyclooctenyl | and halogenated substituents of the above, such as 2,3-dibromopropyl, 2-bromoallyl, 2-chloro-4-methylbenzyl, 2-methyl-4-chlorophenyl, β-bromostyryl, p-bromophenyl, chlorocyclohexyl and chlorcyclohexenyl. Broadly, the imides of this invention may be generally described as N-(hydrogen or hydrocarbyl)-polyhalopolyhydropolycyclicdicarboxylic imides.

The fire retarding agents described herein may be employed to reduce the flammability of any normally flammable or synthetic organic material, including cotton, wool, silk, paper, natural rubber, wood and paint, and are particularly effective in compositions of solid synthetic polymers. Illustrative of such polymers are the high molecular weight homopolymers and copolymers of unsaturated aliphatic and aromatic hydrocarbons, such as ethylene, propylene and styrene; acrylic polymers, such as polyacrylonitrile and poly(methyl methacrylate); alkyd resins; cellulose derivatives, such as cellulose acetate and methyl cellulose; epoxy resins; furan resins; isocyanate resins, such as the polyurethanes, melamine resins; polyamide polymers, such as nylon-6 and nylon-66; polyester resins; vinyl resins, such as (poly)vinyl acetate and (poly)vinyl chloride; resorcinol resins; rubbers, such as polyisoprene, polybutadiene, butadiene-acrylonitrile rubber, butadiene-styrene rubber, butyl rubber and neoprene rubber; ABS resins; and mixtures of such solid polymers.

Such normally flammable organic materials desirably are intimately mixed with the halogenated imide fire retarding agent. This can be accomplished by any suitable means; e.g., satisfactory results can be obtained with a solid polymer by employing an extruder, a 2-roll mill or a Banbury mixer. Optionally, one also may at this time incorporate in the resulting composition any desired fillers, pigments, plasticizers, antioxidants or other additives. It is often desirable to include one or more of the compounds of antimony, arsenic or bismuth, which are well known synergists for halogenated fire retardants. Antimony trioxide is highly effective and commonly used for this purpose.

While any effective amount of the halogenated and substituted-imide fire retarding agent can be employed to reduce flammability, it is generally desirable that this amount constitute from about 0.5 wt.% to about 20 wt.%, preferably from about 1 wt.% to about 10 wt.% of the total flame retardant composition. It is seldom advantageous to employ larger quantities of the fire retarding agent, except in the preparation of concentrates in which the agent may constitute 50 wt.% or more of the composition. While the Oxygen Index, as determined by ASTM D-2863-70, of "neat" polymers is usually below about 20, higher Oxygen Index values result when valid fire retarding agents are incorporated in the polymer. For example, minimum Oxygen Index values of about 23.8–24.0 are considered desirable for flame retardant compositions of polyethylene, polypropylene and polystyrene. When a metal compound synergist, such as antimony trioxide, also is incorporated in the composition, the synergist usually has a maximum effectiveness when the fire retarding agent to synergist weight ratio varies from about 0.5 to about 4. Another desirable constituent of the composition of this invention is a stabilizer, preferably one of the well known and used vinyl stabilizers, such as an organotin compound. Stabilizers such as these are used to stabilize the fire retarding agent against excessive thermal degradation and discoloration. Another benefit derived from the use of a stabilizer is that corrosion of the metal processing equipment, due to liberation of halogens or halogen acids from the halogenated fire retarding agents, is minimized. A stabilizer, exemplified by an organotin compound, such as dibutyltin maleate, can be used in the range of about 0.05 to about 2.0 wt.%, based on the total flame retardant composition, with a preferable range of from about 0.2 to about 1.0 wt.%.

Because of the extraordinary fire retarding effectiveness of the substituted imides of this invention, both alone and in conjunction with a synergist, they can be used in far lower concentrations than previously known fire retardant materials of equivalent stability. The fact that acceptable levels of flame retardancy can be attained at unexpectedly low loadings of such substituted imide and synergist (with its inherent whitening power and opacity) in solid polymers, makes possible the preparation of polymer compositions having acceptable resistance to combustion and which largely retain the desirable physical characteristics of the pure polymer. It also facilitates coloring of such compositions and makes the preparation of concentrates practicable.

A. PREPARATION OF BROMINATED DIELS-ALDER ADDUCTS

EXAMPLE I

In a flask fitted with a stirrer, a thermometer and a reflux condenser was placed a mixture of 2.6 moles of maleic anhydride and 1 liter of ether. To the stirred mixture was added a solution of 2.6 moles of cyclopentadiene and 65 g. of heptane, in 50 ml. portions, at ambient temperature over a 5 hour period. Stirring was continued for 2 additional hours. The adduct product precipitated during this 7 hour period. The reaction mixture was then cooled to 10°C., filtered, and the precipitate obtained was dried. The precipitate, a white crystalline material, weighed 364 grams and had a melting point of 162°–5°C.

In a flask equipped with a stirrer, reflux condenser, thermometer, and additional funnel, was placed a mixture of 328 g. (2.0 moles) of the maleic anhydride-cyclopentadiene adduct and 2 liters of chloroform. The mixture was stirred at ambient temperature, and 2 moles of bromine were added dropwise. During this addition, the temperature rose to 40°C., and this temperature was maintained by the addition rate of bromine. The addition period was 2 hours, followed by an additional hour of stirring, after which the reaction mixture was filtered, and the precipitate obtained was dried in a vacuum oven at ambient temperature, resulting in a product weighing 465 g. and having a melting point of 209°–210°C. The product, a white crystalline material, contained 48.8% bromine (theory = 49.3% bromine).

EXAMPLE II

In a flask fitted with a stirrer, a thermometer and a reflux condenser was placed 5 moles of maleic anhydride and 25.4 moles of furan. (Furan was used as a solvent). The reaction mixture was stirred at ambient temperature for 6 hours, during which time the reaction temperature increased from ambient to about 30°C. The adduct product precipitated during the reaction period. The reaction mixture was then cooled to 15°C., filtered, and the precipitate obtained was dried. The precipitate weighted 788 grams and had a melting point of 118°C.

In a flask equipped with a stirrer, reflux condenser, thermometer, and additional funnel, was placed a mixture of 498 g. (3.0 moles) of the maleic anhydridefuran adduct and 3.4 liters of chloroform. The mixture was stirred at ambient temperature, and 3.0 moles of bromine were added drop wise. During this addition, the temperature rose to 40°C., and this temperature was maintained by the addition rate of bromine. The addition period was 6 hours, after which the reaction mixture was filtered, and the precipitate obtained was dried in a vacuum oven at ambient temperature, resulting in a product weighing 715 g. and having a melting point of 157°C., with decomposition starting at 278°C., as measured by DTA.

EXAMPLE III

Using the procedure of Example I, the Diels-Alder adduct of maleic anhydride and butadiene was prepared and brominated, resulting in a solid product having a melting point of 200°C.

In similar manner, using the same Diels-Alder adduct as above, chlorine was added to the residual unsaturation of the adduct.

B. PREPARATION OF IMIDES

EXAMPLE IV

Preparation of Phenyl-5,6-dibromonorbornane-2,3-dicarboxylic imide.

Into a 500 ml. flask were put 100 cc. of benzene and 0.05 moles of aniline. The reaction mixture was heated to reflux, and 0.05 moles of 5,6-dibromo-2,3-norbornane dicarboxylic anhydride (the product of Example I) in warm benzene was added to the reaction mixture. The resultant mixture was refluxed for 1.5 hours, cooled to ambient temperature and filtered. A quantitative yield of N-phenyl-5,6-dibromo-2-carboxynorbornane-3-carboxamide was isolated, with a melting point of 180°–190°C.

To a one liter flask equipped with a stirrer, reflux condenser and dropping funnel, was charged 50 g. N-phenyl-5,6-dibromo-2-carboxynorbornane-3-carboxamide and 300 cc. of chloroform. The mixture was stirred and 34 cc. (0.46 mole) of $SOCl_2$ was added over a 10 minute period. The mixture was heated to reflux and maintained at that temperature for 6 hours. The reaction mixture was cooled to ambient temperature and poured over ice. The resultant mixture was stirred for one hour and filtered. The product was successively washed with 1 portion of water and 2 separate portions of hot glacial acetic acid. The white crystalline material obtained was dried at 50°C overnight. An 80% yield of N-phenyl-5,6-dibromonorbornane-2,3-dicarboxylic imide was obtained, with a melting range of 300°–305°C., with decomposition. Analysis: Calculated for $C_{15}H_{13}Br_2NO_2$; Br-40%, N-3.5%, Found: Br-39%, N-3.3%. The brominated phenyl imide has excellent thermal properties, i.e., thermally stable, high melting point and low volatility.

EXAMPLE V a. Preparation of N-(allyl)-5,6-dibromonorbornane-2,3-dicarboxylic imide.

Using the procedure of Example IV, a 0.1 mole of 5,6-dibromonorbornane-2,3-dicarboxylic anhydride was reacted with 0.1 mole allyl amine. The resultant carboxamide was treated with thionyl chloride, giving the N-allyl imide, melting at 196°–200°C.

b. Preparation of N-(2,3-dibromopropyl)-5,6-dibromonorbornane-2,3-dicarboxylic imide.

Since the N-allyl imide contained unsaturation, bromine was added to the compound to enhance the fire retarding properties.

To a flask equipped with a stirrer, reflux condenser, thermometer and additional funnel were charged 0.05 moles (18.3 g.) N-allyl-5,6-dibromonorbornane-2,3-dicarboxylic imide and 200 cc. of chloroform. To the stirred mixture was added 0.05 moles bromine, over a 1 hour period at ambient temperature. During the addition, the temperature increased to about 40°C. The reaction mixture was stirred for 1 hour after the completion of addition, cooled to 10°C. and filtered. The crude product was isolated and recrystallized from glacial acetic acid, to give an 87% yield of N-(2,3-dibromopropyl)-5,6-dibromonorbornane-2,3-dicarboxylic imide. The product had a melting point of 170°–178°C., bubbling at 240°C. Analysis: Calculated for $C_{12}H_{13}Br_4NO_2$; Br-61%, N-2.67%; Found; Br-60.7%, N-2.58%.

EXAMPLE VI

Preparation of N-benzyl-5,6-dibromonorbornane-2,3-dicarboxylic imide.

Using the procedure of Example IV, 5,6-dibromonorbornane-2,3-dicarboxylic anhydride was reacted with benzylamine. N-benzyl-5,6-dibromonorbornane-2,3-dicarboxylic imide, having a melting point of 200°–202°C., was obtained. Analysis:

Calculated for $C_{16}H_{15}Br_2HO_2$; Br-38.7%, N-3.3%; Found, Br-38.6%, N-3.3%.

EXAMPLE VII

Preparation of N-p-tolyl-5,6-dibromonorbornane-2,3-dicarboxylic imide.

Using the procedure of Example IV, 5,6-dibromonorbornane-2,3-dicarboxylic anhydride was reacted with p-toluidine. The product, N-p-tolyl-5,6-dibromonorbornane-2,3-dicarboxylic imide, having a melting point of 250°–252°C., was obtained. Analysis: Calculated for $C_{16}H_{15}Br_2NO_2$; Br-38.7%, N-3.3%; Found; Br-38.2%, N-3.3%.

EXAMPLE VIII

Preparation of N-x-phenyl-5,6-dibromonorbornane-2,3-dicarboxylic imide (x = p-bromo-, 2,5-dibromo- or 2,4-dibromo-).

To a 500 ml. resin kettle, equipped with a stirrer reflux condenser and thermometer, were charged 0.1 mole of x-aniline, 0.1 mole 5,6-dibromonorbornane-2,3-dicarboxylic anhydride and 300 cc. of $CHCl_3$. The reaction mixture was heated to reflux and refluxed for 1.5 hours, followed by cooling to ambient temperature. Then 4 moles $SOCl_2$ were added to the cooled mixture over a period of ½ hour, followed by refluxing for 6 hours. The reaction mixture was then cooled to ambient temperature and poured over ice. The precipitate formed was filtered and washed twice with 200 cc. portions of acetic acid. The product was dried in a vacuum oven at 50°C. over night. Yield and analytical data follow:

tion, resulting in N-(2,3-dichloropropyl)-5,6-dibromonorbornane-2,3-dicarboxylic imide.

EXAMPLE X

The unsubstituted (on the nitrogen atom) imide was prepared, using the typical procedure, by reacting the brominated Diels-Alder adduct of maleic anhydride and butadiene, in $CHCl_3$ solution, with gaseous $NH_3$.

EXAMPLE XI

By reacting sec. butylamine with the brominated adduct of maleic anhydride and furan, an N-substituted imide containing a butyl group was prepared.

EXAMPLE XII

The brominated adduct of maleic anhydride and furan (from Example II) reacted with aniline, forming an imide having a melting range of 211°–214°C.

B. TESTING OF FIRE RETARDANT IMIDES

A typical procedure for preparing flame retardant compositions consists of weighing the normally flammable organic material, such a polypropylene, and charging it to a Brabender at 356°F. The desired amount of synergist, such as antimony trioxide, is added and mixed until evenly dispersed. The desired amount of the fire retarding agent is then added to the mixture in the Brabender. This mixture, along with any other additives, such as stabilizers or colorants, is mixed in the Brabender at 356°F. for about 10 minutes. The well-mixed composition is compressed and molded at 300°F. and 40,000 psig into a slab approximately 2 inches × 5 inches nad allowed to cool at ambient temperature. A ⅛ inch × ¼ inch × 5 inch piece of the molded composition is then cut, and an Oxygen Index determined, using ASTM-D-2863 procedure.

| Compound | % Yield | M.P. C° | Analysis Theory Br | N | Found Br | N |
|---|---|---|---|---|---|---|
| N-Parabromophenyl-5,6-dibromonorbornane-2,3-dicarboxylic imide $C_{15}H_{12}Br_3NO_2$ | 86 | 192–198 | 53.8 | 3.1 | 47.8 | 2.7 |
| N-2,5-dibromophenyl-5,6-dibromonorbornane-2,3-dicarboxylic imide $C_{15}H_{11}Br_4NO_2$ | 86 | 292–300 | 60.2 | 2.2 | 55.5 | 2.3 |
| N-2,4-dibromophenyl-5,6-dibromonorbornane-2,3-dicarboxylic imide $C_{15}H_{11}Br_4NO_2$ | 66 | 300–302 | 60.2 | 2.2 | 56.6 | 2.3 |

EXAMPLE IX

As a variation of part (b) of Example V, the N-allyl imide was chlorinated in the carbon-carbon unsaturation, resulting in N-(2,3-dichloropropyl)-5,6-dibromonorbornane-2,3-dicarboxylic imide.

The following tables exemplify typical formulations and Oxygen Index data for various synthetic polymers and fire retarding agents of this invention.

TABLE I

EVALUATION OF FLAME RETARDANT COMPOSITIONS

| Run No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Prolypropylene (g.) | 100 | | | | 88.5 | 88.5 | 94.0 | 92.5 | | | | | 92.0 | | 94.0 | 96.0 |
| Polyethylene (g.) | | 100 | | | | | | | 88.7 | 92.5 | | | | | | |
| ABS (g.) | | | 100 | | | | | | | | 76.5 | | | 78.0 | | |
| Impact Polystyrene (g.) | | | | 100 | | | | | | | | 79.0 | | | | |
| Synergist ($Sb_2O_3$) (g.) | | | | | 3.7 | 3.7 | 2.0 | 2.5 | 3.8 | 2.5 | 10.0 | 6.0 | 2.5 | 8.5 | 2.0 | 1.25 |
| Dibutyltin Stabilizer (g.) | | | | | | 0.1 | 0.1 | 0.1 | | | 1.0 | | 1.0 | | | |
| N-Phenyl Imide[(a)] (g.) | | | | | 7.5 | 7.5 | 4.0 | 5.0 | 7.5 | | 12.5 | | | | | |
| N-Propyl Imide[(b)] (g.) | | | | | | | | | | 5.0 | | 15.0 | 5.0 | 12.5 | 4.0 | 2.5 |
| Oxygen Index (ASTM-D-2863-70) | 18.0 | 17.8 | 19.4 | 18.8 | 27.1 | 27.1 | 25.5 | 26.5 | 26.5 | 26.8 | 25.2 | 26.5 | 27.5 | 30.6 | 26.5 | 24.8 |
| Flammability (UL-94) | | | | | SE-2 | SE-2 | SE-2 | SE-2 | SE-2 | | SE-1 | | SE-2 | SE-1 | SE-2 | SE-2 |

[(a)]N-phenyl-5,6-dibromonorbornane-2,3-dicarboxylic imide.
[(b)]N-(2,3-dibromopropyl)-5,6-dibromonorbornane-2,3-dicarboxylic imide.

TABLE II

EVALUATION OF FLAME RETARDANT COMPOSITIONS

| Run No. | 1 | 2 | 3 | 17 | 18 | 19 | 20 | 21 | 22 | 23 | 24 | 25 |
|---|---|---|---|---|---|---|---|---|---|---|---|---|
| Polypropylene (g.) | 100 | | | 88.5 | 94.0 | | | | 88.5 | 94.0 | | |
| Polyethylene (g.) | | 100 | | | | 76.7 | 76.8 | | | | 76.7 | 76.8 |
| ABS (g.) | | | 100 | | | | | 62.8 | | | | |
| Synergist (Sb$_2$O$_3$) (g.) | | | | 3.7 | 2.0 | 7.7 | 7.7 | 14.0 | 3.7 | 2.0 | 7.7 | 7.7 |
| Dibutyltin Stabilizer (g.) | | | | | | | | | | | 0.1 | |
| N-p-Tolyl Imide[a] (g.) | | | | 7.7 | 4.0 | 15.5 | 15.5 | 23.2 | | | | |
| N-Benzyl Imide[b] (g.) | | | | | | | | | 7.7 | 4.0 | 15.5 | 15.5 |
| Oxygen Index | 18.0 | 17.8 | 19.4 | 26.9 | 25.5 | 25.8 | 25.8 | 28.4 | 26.9 | 25.2 | 26.2 | 26.2 |
| Flammability (UL-94) | | | | SE-2 | SE-2 | SE-2 | SE-2 | | SE-2 | SE-2 | SE-2 | SE-2 |

[a] N-p-tolyl-5,6-dibromonorbornane-2,3-dicarboxylic imide.
[b] N-benzyl-5,6-dibromonorbornane-2,3-dicarboxylic imide.

TABLE III

EVALUATION OF FLAME RETARDANT COMPOSITIONS

| Run No. | 1 | 2 | 3 | 26 | 27 | 28 | 29 | 30 | 31 | 32 | 33 | 34 | 35 |
|---|---|---|---|---|---|---|---|---|---|---|---|---|---|
| Polypropylene (g.) | 100 | | | | 91.0 | 92.2 | 92.2 | 84.2 | 84.2 | | 71.2 | 74.7 | 74.7 |
| Polyethylene (g.) | | 100 | | 82.0 | | | | | | 76.0 | | | |
| ABS (g.) | | | 100 | | | | | | | | | | |
| Synergist (Sb$_2$O$_3$) (g.) | | | | 6.0 | 3.0 | 2.5 | 2.5 | 5.2 | 5.2 | 8.0 | 10.7 | 4.5 | 4.5 |
| N-p-bromophenyl Imide[c] (g.) | | | | 12.0 | 6.0 | | | | | | 18.0 | | |
| N-2,5-dibromophenyl Imide[d] (g.) | | | | | | 5.2 | | 10.5 | | | | 15.7 | |
| N-2,4-dibromophenyl Imide[e] (g.) | | | | | | | 5.2 | | 10.5 | 16.0 | | | 15.7 |
| Oxygen Index | 18.0 | 17.8 | 19.4 | 24.8 | 27.5 | 26.2 | 26.2 | 27.2 | 26.9 | 27.0 | 29.6 | 26.5 | 26.9 |
| Flammability (UL-94) | | | | SE-2 | SE-2 | SE-2 | SE-2 | SE-2 | SE-2 | SE-2 | SE-2 | SE-2 | SE-2 |

[c] N-p-bromophenyl-5,6-dibromonorbornane-2,3-dicarboxylic imide.
[d] N-2,5-dibromophenyl-5,6-dibromonorbornane-2,3-dicarboxylic imide.
[e] N-2,4-dibromophenyl-5,6-dibromonorbornane-2,3-dicarboxylic imide.

As noted from previous tables, certain substituted imides form desirable flame retardant compositions when used with certain synthetic polymers. Some of the preferred combinations are:

| | | |
|---|---|---|
| Polypropylene | and | N-Phenyl Imide |
| Polypropylene | and | N-Propyl Imide |
| Polypropylene | and | N-p-Bromophenyl Imide |
| Polyethylene | and | N-Propyl Imide |
| Polyethylene | and | N-Benzyl Imide |
| ABS | and | N-Propyl Imide |
| ABS | and | N-Dibromophenyl Imide |

What we claim is:

1. A compound corresponding to the formula:

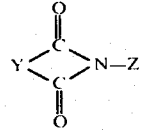

wherein Z is hydrogen or a brominated, chlorinated, or unhalogenated hydrocarbon group selected from cycloalkyl and alkyl having up to 8 carbons, allyl, benzyl, phenyl or methylphenyl, and Y has one of the structures:

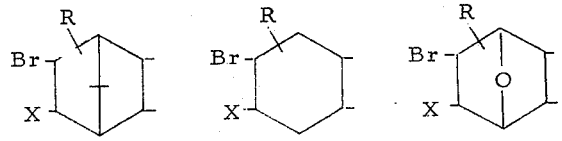

wherein R is hydrogen or methyl, and X is hydrogen, bromo, or chloro.

2. The compound of claim 1 which corresponds to the formula:

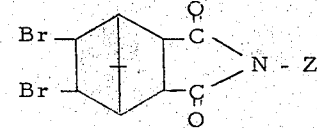

3. The compound of claim 2 wherein Z is phenyl.
4. The compound of claim 2 wherein Z is 2,3-dibromopropyl.
5. The compound of claim 2 wherein Z is tolyl.
6. The compound of claim 2 wherein Z is benzyl.
7. The compound of claim 2 wherein Z is p-bromophenyl.
8. The compound of claim 2 wherein Z is 2,5-dibromophenyl.
9. The compound of claim 2 wherein Z is 2,4-dibromophenyl.
10. The compound of claim 2 wherein Z is a chlorinated phenyl or methyl phenyl.

* * * * *

PO-1050
(5/69)

UNITED STATES PATENT OFFICE
CERTIFICATE OF CORRECTION

Patent No. 3,903,109      Dated Sept. 2, 1975

Inventor(s) Anderson O. Dotson, Jr.

It is certified that error appears in the above-identified patent and that said Letters Patent are hereby corrected as shown below:

On page 1, left hand column, line 7, the name of the assignee should read --Cities Service Company--. Column 8, line 31, "nad" should read --and--.

Signed and Sealed this twenty-fifth Day of November 1975

[SEAL]

Attest:

RUTH C. MASON
*Attesting Officer*

C. MARSHALL DANN
*Commissioner of Patents and Trademarks*